US 10,146,920 B2

United States Patent
Thuillier et al.

(10) Patent No.: US 10,146,920 B2
(45) Date of Patent: Dec. 4, 2018

(54) METHOD AND SYSTEM FOR BIOMETRIC IDENTIFICATION WITH ACCELERATED TREATMENT

(71) Applicant: MORPHO, Issy-les-Moulineaux (FR)

(72) Inventors: Cedric Thuillier, Issy-les-Moulineaux (FR); Jerome Bayon de Noyer, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/906,445

(22) PCT Filed: Jul. 24, 2014

(86) PCT No.: PCT/EP2014/065886
§ 371 (c)(1),
(2) Date: Jan. 20, 2016

(87) PCT Pub. No.: WO2015/011219
PCT Pub. Date: Jan. 29, 2015

(65) Prior Publication Data
US 2016/0180071 A1    Jun. 23, 2016

(30) Foreign Application Priority Data
Jul. 26, 2013  (FR) .................... 13 57418

(51) Int. Cl.
*G06F 21/00*   (2013.01)
*G06F 21/32*   (2013.01)

(52) U.S. Cl.
CPC .................... *G06F 21/32* (2013.01)

(58) Field of Classification Search
CPC ................. G06F 21/32; G06F 21/31
(Continued)

(56) References Cited

U.S. PATENT DOCUMENTS

| | | | | |
|---|---|---|---|---|
| 2006/0005025 A1* | 1/2006 | Okada | ................. | G06Q 20/341 |
| | | | | 713/168 |
| 2006/0104485 A1* | 5/2006 | Miller, Jr. | ......... | G06K 9/00885 |
| | | | | 382/115 |
| 2010/0148922 A1* | 6/2010 | Yamada | ................. | G06F 21/32 |
| | | | | 340/5.82 |

FOREIGN PATENT DOCUMENTS

| | | |
|---|---|---|
| EP | 2 339 498 A1 | 6/2011 |
| WO | WO 2004/023384 A2 | 3/2004 |
| WO | WO 2004/023384 A3 | 3/2004 |

OTHER PUBLICATIONS

Jain A. K. et al, "Learning user-specific parameters in a multi biometric system", International Conference on Image Processing (ICIP). IEEE, vol. 1, Sep. 22, 2002, pp. 57-60.

(Continued)

*Primary Examiner* — Syed A Zaidi
(74) *Attorney, Agent, or Firm* — Muncy, Geissler, Olds & Lowe, P.C.

(57) ABSTRACT

Identification method using data in a database that are distributed in at least a first group of data and a second group of data, a comparison being made using first of all the biometric data in the first group and then, in the event of failure of the comparison, using the biometric data in the second group, the distribution of the data between the groups being modified according to a number of validated identifications stored for each user, the first group comprising the data of the user comprising a number of validated identifications greater than a predetermined threshold over a predetermined period and identification system for implementing this method.

11 Claims, 1 Drawing Sheet

(58) Field of Classification Search
USPC .......................................................... 726/18
See application file for complete search history.

(56) References Cited

OTHER PUBLICATIONS

Ross A. et al, "Multimodal Biometrics: An Overview", Proc. of 12th European Signal Processing Conference (EUSIPCO), Vienna, Austria Sep. 30, 2004, pp. 1221-1224.

* cited by examiner

METHOD AND SYSTEM FOR BIOMETRIC IDENTIFICATION WITH ACCELERATED TREATMENT

BACKGROUND OF THE INVENTION

The present invention concerns a biometric identification method and system.

Biometric identification methods and systems are based on the comparison of biometric data of a candidate for identification and of user biometric data that have been previously stored, for example in a database. The identification is validated when the biometric data of the candidate correspond to biometric data of one of the users, the biometric data of which are stored in the database.

The biometric data result from the treatment of biometric characteristics detected on the candidate and on the users. The biometric characteristics concern for example fingerprints, patterns in the irises of the eyes, features of the face, etc., and are generally captured by optical means connected to a computerised processing unit. The optical means supply to the computerised processing unit images in the form of signals, from which an image processing program extracts the biometric characteristics and codes them by computer in order to form the biometric data. The computerised processing unit hosts the database containing the identification data, including biometric data, of users that have previously been captured and stored, and executes a comparison (or matching) program that compares the biometric data of the candidate with the biometric data stored in order to validate or refuse identification.

Such identification systems are for example used at the entrance to premises with regulated access. An identification system with one or more biometric capture devices each associated with a gate is disposed at the entrance to the regulated-access premises in order to control opening of the gates in the case of validated identification.

One drawback of such biometric identification systems lies mainly in the time taken by the comparison of the biometric data since the larger the number of biometric data in the database, the longer the comparison.

In order not to create bottlenecks at the entrance to the regulated-access premises, increasing the number of biometric capture devices and gates is known. This solution is however expensive and has a space requirement more or less suited to the configuration of the premises. Furthermore, the time waiting for the validation of the identification is certainly a nuisance from a global point of view because of the creation of bottlenecks but also from an individual point of view since the candidate for identification may consider that he is wasting his time while he is awaiting validation of his identification, all the more so since he may be caused to have to identify himself several times a day at the same place.

One solution to this problem is to increase the power of the computing means of the computerised processing unit. This solution is however also expensive.

Another solution would be to divide the database into two groups, between which the characteristics of the users are distributed. Each user would be informed of a group to which he has been allocated and should indicate this at the moment of capture, using a keypad of the capture device. This solution has the advantage of having limited impact on the hardware cost. However, it assumes that the user remembers the group to which he has been allocated and despite everything requires the presence of a keypad, the integration of which on the biometric capture device increases the cost of the latter.

BRIEF SUMMARY OF THE INVENTION

One aim of the invention is to afford a reduction in the time necessary for identifying some of the users of an identification system.

To this end, according to the invention, a method is provided for identifying persons from at least one database that is hosted on a computing unit and contains identification data of users, including biometric data relating to biometric characteristics of the users, the method comprising the steps of capturing and coding by computer, as a predetermined identity check site, biometric characteristics of a candidate for identification in order to form biometric data of the candidate, comparing and executing a program comparing the biometric data of the candidate with the biometric data of the database and validating or rejecting the identification according to the result of the comparison. The data in the database are distributed in at least a first group of data and a second group of data, and the comparison is made using first of all the biometric data of the first group and then, in the event of failure of the comparison, using the biometric data of the second group.

Thus it is possible to favour users by allocating them to the first group. The comparison according to the groups is completely transparent for the users, who do not have to recall the group to which they have been allocated.

According to a particular embodiment, the method comprises a second step of capture and computerised coding of biometric data in the case of failure of the comparison using the data of the first group, the computerised coding carried out during the second step of capture and coding being more precise than the computerised coding carried out during the first capture and coding step, the comparison using the data of the second group being carried out on the basis of the biometric data captured and coded during the second capture and coding step.

A relatively rapid capture and coding step is used for the regular users and a more precise capture and coding step is used for the non-regular users.

Advantageously then, according to an alternative:
the second group contains all the data of the database, that is to say also of the data of the first group;
the second capture and coding step is followed by a comparison of the data of the first group and the data issuing from the second capture and coding step, and the comparison using the data of the second group being made in the event of failure of this comparison of the data of the first group and the data issuing from the second capture step.

There is a risk that the users of the first group may suffer failure of the identification because of a capture or coding problem. This may happen for example in an identification method using a fingerprint if the skin of the finger that the candidate has used for the capture had an abrasion region or a cut impairing the legibility of the fingerprint. The method of the invention subjects the users of the first group who have suffered an identification failure to the second capture step. If the first capture and coding step is more rapid than the second and is normally sufficient in normal conditions of use for validating the identification, the second capture and coding step, more precise but normally slower, makes it possible to avoid a refusal to identify a regular user that would result from a capture or coding problem.

Preferably, the comparison using the data of the first group is made by means of a relatively brief comparison method and the comparison using the data of the second group is made by means of a relatively thorough comparison method.

The comparison made on the data of the second group is slower but more reliable than that made on the data of the first group, considering that the risk of a fraud is greater vis-à-vis non-regular users.

Advantageously, the distribution of the data between the groups is modified according to a number of validated identifications stored for each user, the first group comprising the data of the users comprising a number of validated identifications greater than a predetermined threshold over a predetermined period.

Thus the regular users will automatically be allocated to the first group and the irregular users to the second group. The identification of the regular users is validated more quickly than those of the non-regular users. The result is an overall reduction in the time necessary for identification.

According to a first advantageous feature, the method comprises the step of allocating to at least one user a number of validated identifications greater than the number of identifications actually validated by said user.

This makes it possible to define priority users by making these regular users even if they are not so in reality.

According to a second advantageous feature, in a method used for controlling access to at least two sites, the distribution is particular to each site and takes account of the number of identifications validated on each of the sites.

The regular users of a site are not necessarily the same as those of the other site. With the invention, each site thus has a group of its own regular users.

Preferably, the method comprises the step of periodically reducing the number of validated identifications for all the users and/or the threshold is recalculated periodically.

This makes it possible to ensure that the users classified in the first group are indeed always the users that can be termed regulars.

Another subject matter of the invention is a biometric identification system comprising a computerised processing unit connected to at least one unit for capturing and coding biometric characteristics to form biometric data, the computing unit hosting a database that contains identification data of users including biometric data relating to biometric characteristics of the users and being arranged to execute at least one computer program for implementing the method of the above type.

Other features and advantages of the invention will emerge from a reading of the following description of particular non-limitative embodiments of the invention.

BRIEF DESCRIPTION OF THE DRAWINGS

Reference will be made to the accompanying drawings, among which.

DETAILED DESCRIPTION OF THE INVENTION

The biometric identification method and system according to the invention are described here in application of an identification by means of fingerprints. It goes without saying that other biometric characteristics can be used and in particular palm prints, the patterns of irises of the eyes, facial features, the shape of auricles of the ears, etc.

Figure 1:
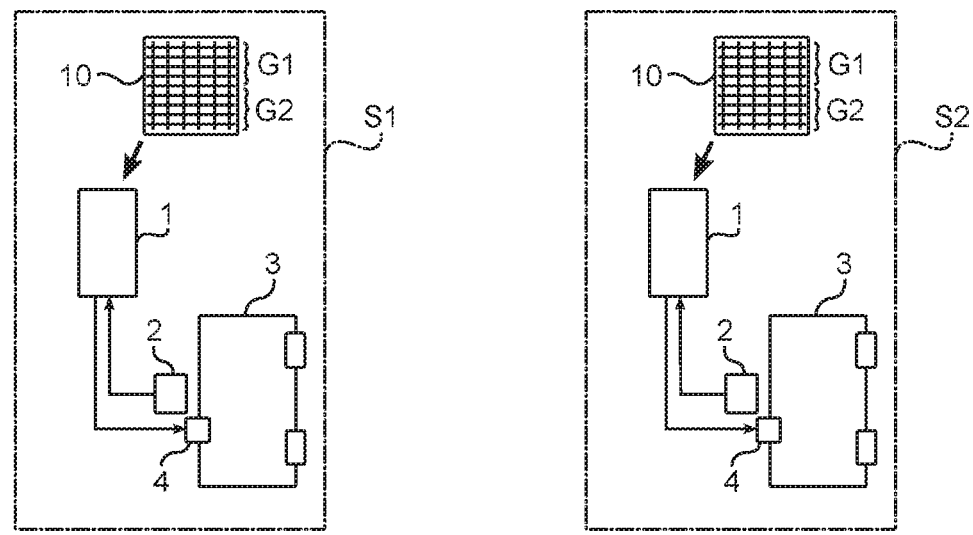
FIG. 1 is a schematic view of an identification system according to the invention.

With reference to FIG. 1, the system according to the invention is established on two sites S1, S2, for example two sites of a company to which the members of the company must be able to have access subject to being identified by the biometric identification system.

On each site S1, S2, the identification system comprises a computerised processing unit 1 connected to at least one unit 2 for capturing and coding biometric characteristics.

The capture and coding unit 2 comprises, in a manner know per se, an image sensor and an illumination member that are oriented towards a capture zone in which the user must present a finger to make the capture. The capture and coding unit 2 is associated with a gate 3.

The computerised unit 1, known per se, has a memory hosting a database 10 that contains user identification data, including biometric data relating to biometric characteristics of the users. The memory contains at least one computer program for implementing the method according to the invention. The computerised unit 1 is arranged so as to execute this program. The computer program comprises a biometric data comparison (or matching) module known per se and a module controlling the lock 4 of the gate 3 according to the result of the identification.

The capture and coding unit 2 is arranged in a manner known per se for detecting biometric characteristics on the finger in question, coding them and transmitting them to the computerised processing unit 1 in order to form biometric data.

The database 10 contains data identifying the members of the company (the users), including biometric data relating to biometric characteristics of the users. During a prior so-called enrolment step, one or more fingerprints of each user were captured, coded and processed in order to form biometric data that are stored in the database with the names of the users, optionally access rights, an address, their functions, a telephone extension number, the name of a manager, etc.

The user identification data are allocated to two groups in the database 10. A first of these groups, G1, is intended to contain the identification data of the regular users of the site S1, S2 concerned and the second of these groups, G2, is intended to contain the identification date of all the users. Allocation to the groups is for example obtained by filling in a field in the database. When the system is configured, users are allocated to the first group in principle on the basis of the place where the users are deemed to work and/or on the basis of their function.

The database 10 further comprises a field intended to contain a number of validated identifications. This number is automatically incremented at each validated identification.

When a candidate for identification presents themselves opposite the gate, he presents his finger in the capture zone of the capture and coding device 2.

Figure 2:
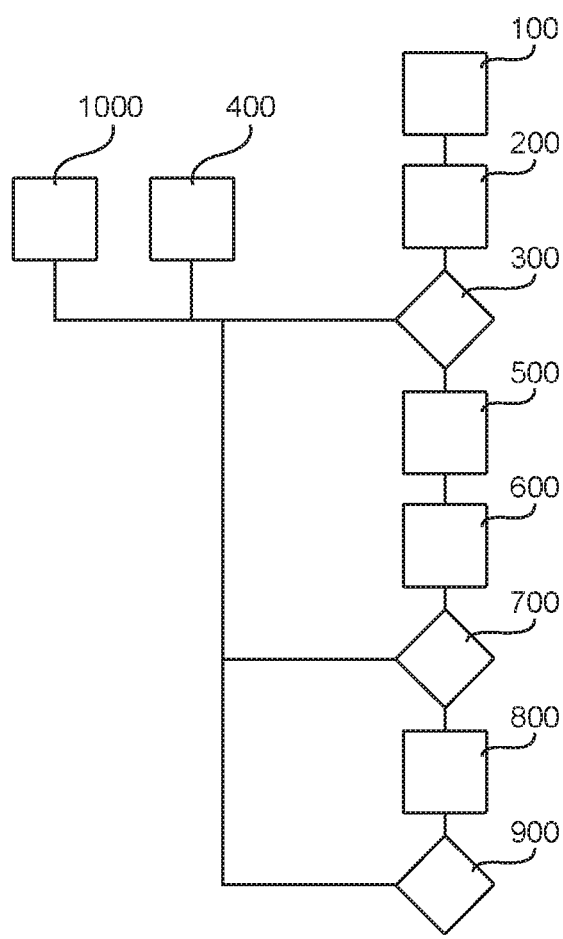
FIG. 2 is a block diagram showing the unfolding of the identification method according to the invention.

With reference to FIG. 2, the identification method used during the execution of the program by the computerised processing unit 2 begins with the step 100 consisting of capturing and coding by computer the characteristics of the fingerprint of the candidate for identification in order to form biometric data of the candidate.

A first comparison step 200 is next performed, in which the biometric data of the candidate are compared with the data in the first group G1.

The result of the comparison is next assessed (step 300).

In the event of validation of the comparison (the biometric data of the candidate correspond to those of a user in the first group), the gate is opened (step 400).

In the event of failure of the comparison, the user must once again present his finger in the capture zone. A second computerised capture and coding step 500 is then performed. The computerised coding carried out during the second capture and coding step 500 is more precise than the computerised coding carried out during the first capture and coding step 100.

The second capture and coding step 500 is followed by a second comparison step 600 during which the biometric data in the first group and the biometric data issuing from the second captured coding step 500 are compared.

The result of the second comparison step 600 is assessed (step 700):
- in the event of validation of the comparison (the biometric data of the candidate correspond to those of a user in the first group), the gate is opened (step 400),
- in the event of failure of this last comparison, a third comparison step 800 is performed, during which the biometric data issuing from the second capture and coding step 500 are compared with the biometric data in the second group.

The result of the third comparison is assessed (step 900):
- in the event of validation of the comparison, the biometric data of the candidate correspond to those of a user in the second group), the gate is opened (step 400),
- in the event of failure of the third comparison, the identification is rejected and the computerised processing unit 2 does not demand opening of the gate. Provision may also be made for this failure to trigger emission of an alert to the site security department.

The comparison steps 600 and 800 are performed by means of a comparison algorithm more precise than for the first comparison step 200.

As soon as the identification is validated, the computerised processing unit 2 demands the opening of the gate 3 and also increments the number of validated identifications stored in the database for the user identified (step 1000).

Periodically, (for example once a day), the number of validated identifications stored for each user is compared with a predetermined threshold. When the number of validated identifications of a user becomes greater than the predetermined threshold, the user is allocated to the first group. It will be understood that the users in the first group are not necessarily the same in the two sites S1, S2.

The threshold is for example calculated so as to minimise the following function F:

$$F = T1*P1 + T2*(1-P1)$$

in which T1 is the duration of steps 100, 200 and 300; T2 is the duration of steps 500, 600, 700, 800, 900; P1 is the probability that the user is a regular user (corresponds to the ratio of regular users to the total number of users).

The distribution of the data between the groups is thus modified according to the number of validated identifications stored for each user, the first group comprising the data of the users comprising a number of validated identifications greater than the predetermined threshold over a predetermined period.

The method further comprises the step of periodically reducing the number of validated identifications for all the users.

This makes it possible to eliminate from the first group the users where the frequency of frequenting of the site in question has dropped.

Provision is also made for the step of periodically recalculating the threshold, still for the purpose of ensuring that the users in the first group are indeed regular users of the site in question.

During configuration, the method may further comprise the step of allocating to at least one user a number of validated identifications greater than the number of identifications actually validated by said user. This user may for example be the holder of a transverse function leading him to frequent the two sites, for example a manager of the company.

Naturally the invention is not limited to the embodiments described but encompasses any variant falling within the field of the invention as defined by the claims.

In particular, the computer system may have an architecture distinct from the one described. The system may for example comprise a database hosted on a common server to which the computerised units on each site are connected. The database comprises a field comprising the number of validated identifications on each site and the group to which each user belongs for each site.

The method may comprise only one capture and coding step. The comparison is then made in two phases:
- in a first phase, the comparison is made by comparing the biometric data of the candidate (issuing from the single capture and coding step) and the data in the first group G1;
- in the event of failure of the comparison, the comparison is made by comparing the biometric data of the candidate (issuing from the single capture and coding step) and the data of the second group G2.

The comparison steps may be made by means of the same algorithm.

The second group may not comprise the identification data in the first group.

Various features can be used or not, and in particular:
- the statistical counters used for the distribution into groups decrease over time. These counters continue to be individually incremented at each positive user of the equipment, they are decremented overall as they age. The aim is that new frequent users are not disadvantaged to the detriment of older users;
- the distribution of the biometric data in the various groups is done with the use of statistics individual to each person. These individual statistics are incremented at each positive identification in the equipment. Users frequently using the device are thus favoured to the detriment of those identifying themselves occasionally.

The invention claimed is:

1. A method for identifying persons from at least one database that is hosted on a computing unit and contains identification data of users, including biometric data relating to biometric characteristics of the users, said biometric characteristics being of a predetermined type and the identification data contained in the database being distributed in at least a first group of identification data and a second group of identification data, the biometric data of the identification data of the first group relating to the same predetermined type of biometric characteristics as the predetermined type of the biometric characteristics to which the biometric data of the identification data of the second group relate, the method comprising:
    capturing and coding by computer, at a predetermined identity check site, biometric characteristics of a candidate for identification in order to form biometric data of the candidate, the biometric characteristics of the candidate being of the same predetermined type as the predetermined type of the biometric characteristics to which the biometric data of the identification data of both the first group and the second group relate;

comparing and executing a program comparing the biometric data of the candidate with the biometric data of the identification data of the first group; and validating the identification if the comparison is successful, and then, in the event of failure of the comparison, comparing the biometric data of the candidate with the biometric data of the identification data of the second group; and validating or rejecting the identification according to the result of the comparison.

2. The method according to claim 1, further comprising a second step of capture and computerised coding of biometric characteristics of the predetermined type in the case of failure of the comparison using the data of the first group, the computerised coding carried out during the second step of capture and coding being more precise than the computerised coding carried out during the first capture and coding step, the comparison using the data of the second group being carried out on the basis of the biometric data captured and coded during the second capture and coding step.

3. The method according to claim 2, wherein the second group contains all the data in the database including the data in the first group.

4. The method according to claim 2, wherein the second capture and coding step is followed by a comparison of the data of the first group and the data issuing from the second capture and coding step, and the comparison using the data of the second group being made in the event of failure of this comparison of the data of the first group and the data issuing from the second capture step.

5. The method according to claim 1, wherein the comparison using the data of the first group is made with less precise computerised coding than computerised coding used in the comparison using the data of the second group.

6. The method according to claim 1, wherein the distribution of the data between the groups is modified according to a number of validated identifications stored for each user, the first group comprising the data of the users comprising a number of validated identifications greater than a predetermined threshold over a predetermined period.

7. The method according to claim 1, further comprising allocating to at least one user a number of validated identifications greater than the number of identifications actually validated by said user.

8. The method according to claim 7, wherein the method is used for controlling access to at least two sites, in which the distribution is particular to each site and takes account of the number of validated identifications on each of the sites.

9. The method according to claim 7, further comprising periodically reducing the number of validated identifications for all the users.

10. The method according to claim 7, wherein the threshold is recalculated periodically.

11. A biometric identification system comprising:

a computerised processing unit connected to at least one unit for capturing and coding biometric characteristics of a predetermined type to form biometric data, the computerized processing unit comprising:

a memory hosting a database that contains identification data of users including biometric data relating to biometric characteristics of the users, said biometric characteristics being of a predetermined type and the identification data contained in the database being distributed in at least a first group of identification data and a second group of identification data, the biometric data of the identification data of the first group relating to the same predetermined type of biometric characteristics as the predetermined type of the biometric characteristics to which the biometric data of the identification data of the second group relate; and at least one computer program, wherein the computerised processing unit is arranged to execute said computer program for implementing the method comprising:

capturing and coding by computer, at a predetermined identity check site, biometric characteristics of a candidate for identification in order to form biometric data of the candidate, the biometric characteristics of the candidate being of the same predetermined type as the predetermined type of the biometric characteristics to which the biometric data of the identification data of both the first group and the second group relate;

comparing and executing a program comparing the biometric data of the candidate with the biometric data of the identification data of the first group; and validating the identification if the comparison is successful, and then, in the event of failure of the comparison, comparing the biometric data of the candidate with the biometric data of the identification data of the second group; and validating or rejecting the identification according to the result of the comparison.

* * * * *